United States Patent [19]

Gati et al.

[11] 4,330,469
[45] May 18, 1982

[54] REACTIVE DYES, PROCESSES FOR THEIR MANUFACTURE AND THEIR USE

[75] Inventors: Sandor Gati, Birsfelden; Gerd Hölzle, Liestal, both of Switzerland

[73] Assignee: Ciba-Geigy Corporation, Ardsley, N.Y.

[21] Appl. No.: 210,505

[22] Filed: Nov. 25, 1980

Related U.S. Application Data

[63] Continuation of Ser. No. 10,207, Feb. 8, 1979, abandoned.

[30] Foreign Application Priority Data

Feb. 16, 1978 [CH] Switzerland .................. 1697/78

[51] Int. Cl.³ ............................................. C09B 47/04
[52] U.S. Cl. .................................................. 260/242.2
[58] Field of Search ..................................... 260/242.2

[56] References Cited

U.S. PATENT DOCUMENTS 3,082,201  3/1963  Koller ........................ 260/242.2 X
3,190,371  6/1965  Auerbach et al. ............ 260/242.2 X

FOREIGN PATENT DOCUMENTS 1469788  12/1968  Fed. Rep. of Germany ... 260/242.2
1927762  12/1969  Fed. Rep. of Germany ... 260/242.2
1328571   4/1963  France ........................... 260/242.2
 936071   9/1963  United Kingdom ............ 260/242.2
1019771   2/1966  United Kingdom ............ 260/242.2

*Primary Examiner*—Richard Raymond
*Attorney, Agent, or Firm*—Edward McC. Roberts

[57] ABSTRACT

The invention provides reactive dyes of the formula

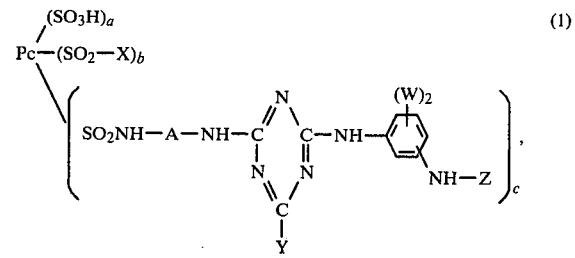

wherein Pc is the radical of a copper or nickel phthalocyanine, X is a substituted or unsubstituted amino group, A is an alkylene or arylene radical, Y is a removable or non-removeable substituent, W is sulfo or carboxyl, and Z is a reactive radical, and a, b and c are whole or fractional numbers, with the proviso that each of a and c is at least 1, b is a value between 0 and 2 and the sum of a+b+c must be 4.

4 Claims, No Drawings

REACTIVE DYES, PROCESSES FOR THEIR MANUFACTURE AND THEIR USE

This is a continuation of application Ser. No. 010,207 filed on Feb. 8, 1979, now abandoned.

The present invention relates to reactive dyes of the formula

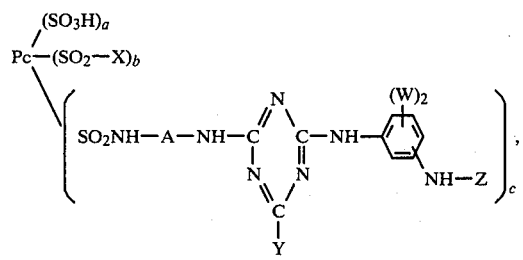

wherein Pc is the radical of a copper or nickel phthalocyanine, X is a substituted or unsubstituted amino group, A is an alkylene or arylene radical, Y is a removable or non-removable substituent, W is sulfo or carboxyl and Z is a reactive radical, and a b and c are whole or fractional numbers, with the proviso that each of a and c is at least 1 and b is a value between 0 and 2 and the sum of $a+b+c$ must be 4.

The radical Pc is in particular the radical of a copper -(3)- or -(4)-phthalocyanine or nickel-(3)- or -(4)-phthalocyanine. The substituted or unsubstituted amino group X is: $-NH_2$ or the radical of an aliphatic, cycloaliphatic, aromatic or heterocyclic amine, for example methylamino, dimethylamino, ethylamino, β-hydroxyethylamino, cyclohexylamino, phenylamino, sulfophenylamino, toluidino, anisidino, naphthylamino, morpholino, piperidino and piperazino. The alkylene or arylene radical A is derived from an aliphatic or aromatic diamine. Accordingly, A can be a linear or branched alkylene radical with a long chain (e.g. containing 10 or more carbon atoms) or with a shorter chain, in particular an alkylene radical of 2 to 6 carbon atoms, for example ethylene, propylene, butylene, hexylene or cyclohexylene. Preferably, A is an aromatic radical, for example a naphthylene radical, the radical of a diphenyl or stilbene or especially a phenylene radical. The radical A can contain further substituents, for example halogen atoms, such as fluorine, chlorine and bromine atoms, alkyl groups of 1 to 4 carbon atoms, such as methyl, ethyl and propyl, alkoxy groups of 1 to 4 carbon atoms, such as methoxy, ethoxy, propyloxy and isopropyloxy, acylamino groups of 1 to 6 carbon atoms, such as acetylamino, propionylamino and benzoylamino, ureido, nitro, carboxyl and sulfo groups.

Preferably, A is a phenylene radical. As a removable substituent, Y can be: sulfo, methylsulfonyl, phenylsulfonyl, carboxyphenylsulfonyl, thiocyano, thiosulfato, mercapto, chloromethoxy, azido, trichloromethyl, cyano and other radicals which are bonded to the s-triazine ring through a carbon, oxygen, sulfur or phosphorus atom, or the radical of a quaternary ammonium salt or in particular a halogen atom, such as fluorine, chlorine and bromine atom. As a non-removable substituent, Y can be a substituted or unsubstituted amino group, a free or etherified hydroxyl group, a free or etherified mercapto group or a substituted or unsubstituted hydrocarbon radical. Examples of such substituents are: $-NH_2$, methylamino, phenylamino, hydroxyl, methoxy, isopropoxy, phenoxy, mercapto, methylthio, phenylthio, methyl, ethyl, phenyl and methylphenyl. Y is preferably halogen, an amino, alkoxy, aryloxy, alkylthio or arylthio group. A suitable reactive radical Z is the radical of a fibre-reactive acylating agent which is introduced by condensation with the amino group, for example a chloroacetylamino, α,β-dibromopropionylamino, 2,3-dichloroquinoxaline-6-carbonylamino, 2,6-dichloropyridylamino, 2,6-difluoro-5-chloropyridmidylamino, 2,5,6-trichloropyrimidylamino, 2,4-dichloropyrimidine-5-carbonylamino, 2,4-dichloro(dibromo or difluoro)-3-triazinyl-6-amino or 2-chloro(bromo or fluoro)-4-amino(alkoxy, aryloxy, alkylthio or arylthio)-s-triazinyl radical. Suitable contenders for the amino, alkoxy, aryloxy, alkylthio or arylthio group contained in the reactive radical just mentioned are not only unsubstituted groups, such as $-NH_2$, ethoxy, phenylamino or phenoxy, but also substituted groups, such as methylamino, methoxyethoxy, sulfophenylamino, chlorophenoxy and the like, in which connection reference is made to the further definition of Y hereinafter. By addition of suitable quaternising components containing a tertiary nitrogen atom, it is possible to convert a halogen atom Y into the radical of a quaternary ammonium salt. Typical examples of quaternising components are: trimethylamine, pyridine, pyridine-4-carboxylic acid, piperazine, N,N-dimethyldimethylhydrazone, N,N-dimethyl-N',N'-dimethyltetrazene and 1,4-diazabicyclo-[2.2.2]-octane.

If Y is an amino, alkoxy, aryloxy, alkylthio or arylthio group, or if Z is a monohalo-s-triazine radical which contains an amino, aryloxy, alkylthio or arylthio group as substituent, examples of such groups are:

Amino group:

$-NH_2$, hydroxylamino, hydrazino, phenylhydrazino, sulfophenylhydrazino, methylamino, ethylamino, propylamino, isopropylamino, butylamino, β-methoxyethylamino, γ-methoxypropylamino, N,N-dimethylamino, N,N-diethylamino, N-methyl-N-phenylamino, N-ethyl-N-phenylamino, β-chloroethylamino, β-hydroxyethylamino, γ-hydroxypropylamino, benzylamino, cyclohexylamino, morpholino, piperidino, piperazino, and especially aromatic amino groups, such as phenylamino, toluidino, xylidino, chloroanilino, anisidino, phenetidino, 2-, 3- or 4-sulfoanilino, 2,5-disulfoanilino, sulfomethylanilino, N-sulfomethylanilino, 3- and 4-carboxyphenylamino, 2-carboxy-5-sulfophenylamino, 2-carboxy-4-sulfophenylamino, 4-sulfonaphthyl (1)-amino, 3,6-disulfonaphthyl(1)-amino, 3,6,8-trisulfonaphthyl(1)-amino and 4,6,8-trisulfonaphthyl(1)-amino;

Alkoxy group:

methoxy, ethoxy, propyloxy, isopropyloxy, butyloxy, β-methoxyethoxy, β-ethoxyethoxy, γ-methoxypropoxy, γ-ethoxypropoxy, γ-propoxypropoxy, γ-isopropoxypropoxy;

Aryloxy group:

phenoxy, 4-methylphenoxy, 3-hydroxyphenoxy, 2-carboxyphenoxy, 4-carboxyphenoxy, 2-, 3- and 4-sulfophenoxy, 1-naphthyloxy, 2-naphthyloxy, 4-sulfo-1-naphthyloxy, 1-methyl-2-naphthyloxy, 3-carboxy-2-naphthyloxy, 6-sulfo-2-naphthyloxy, 3,6-disulfo-2-naphthyloxy;

Alkylthio group:

Methylthio and ethylthio;

Arylthio group:

phenylthio, 1-naphthylthio and 2-naphthylthio.

The two sulfo or carboxyl groups W can be in any position in the phenylene radical. Accordingly, reading from left to right this phenylene radical can be for example 2,6- or 3,5-disulfo-1,4-phenylene, 2,5-disulfo-1,4-phenylene or 4,6-disulfo-1,3-phenylene.

Preferred reactive dyes are those of the formula (1), wherein Pc is the radical of a copper-(3)- or -(4)-phthalocyanine or nickel-(3)- or -(4)-phthalocyanine, X is $-NH_2$, $C_1$-$C_4$alkylamino or N,N-di-$C_1$-$C_4$alkylamino which can be substituted by sulfo, carboxyl, sulfato, halogen, hydroxyl, cyano, phenyl, $C_1$-$C_4$alkoxy, $C_1$-$C_4$alkylamino or hydroxy-$C_1$-$C_4$alkylamino, phenylamino which can be substituted by sulfo, carboxyl, halogen, $C_1$-$C_4$alkyl and $C_1$-$C_4$alkoxy, cyclohexylamino, morpholino, piperidino or piperazino, A is $C_2$-$C_6$ alkylene or phenylene which can be substituted by sulfo, carboxyl, chlorine, methyl, methoxy and ethoxy, Y is halogen, an amino, alkoxy, aryloxy, alkylthio or arylthio group, W is sulfo or carboxyl and Z is a 2,4-dihalo-s-triazinyl-(6) radical or a 2-halo-4-amino(alkoxy, aryloxy, alkylthio or arylthio)-s-triazinyl-(6) radical, and a, b and c are whole or fractional numbers, with the proviso that each of a and c is at least 1 and b is a value between 0 and 2 and the sum of a+b+c must be 4.

Particularly preferred reactive dyes are those of the formula (1), wherein Pc is the radical of a copper-(3)- or -(4)-phthalocyanine or nickel-(3)- or -(4)-phthalocyanine, X is $-NH_2$, β-hydroxyethylamino or β-(β-hydroxyethylamino)-ethylamino, A is ethylene, phenylene or sulfophenylene, Y is chlorine, W is sulfo and Z is a 2-isopropoxy-4-chloro-s-triazinyl-(6) radical, and a, b and c are whole or fractional numbers, with the proviso that each of a and c is at least 1, b is a value between 0 and 2 and the sum of a+b+c must be 4.

A valuable reactive dye of the above defined group is that of Example 2.

The dyes of the formula (1) are fibre-reactive because they contain a reactive radical Z and optionally in addition a removable substituent Y.

By fibre-reactive compounds are meant those compounds which are able to react with the hydroxyl groups of cellulose or with the amino groups of natural or synthetic polyamides to form covalent chemical bonds.

The reactive dyes of the formula (1) are obtained by condensing, in any order, a phthalocyanine of the formula

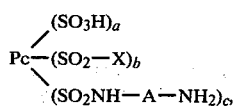

(2)

a halogeno-s-triazine of the formula

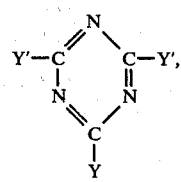

(3)

wherein Y' is halogen, a phenylenediamine of the formula

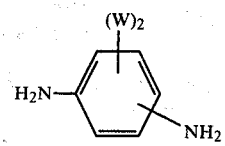

(4)

and an acylating agent of the formula $$Z'-Z \quad (5),$$

wherein Z' is halogen, and in the formulae (2) to (5) the symbols Pc, X, A, Y, W, Z, a, b and c are as defined for formula (1).

A preferred embodiment of the process comprises condensing, in any order, a phthalocyanine of the formula (2), wherein Pc is the radical of a copper-(3)- or -(4)-phthalocyanine or nickel-(3)- or -(4)-phthalocyanine, X is $-NH_2$, $C_1$-$C_4$ alkylamino or N,N-di-$C_1C_4$alkylamino which can be substituted by sulfo, carboxyl, sulfato, halogen, hydroxyl, cyano, phenyl, $C_1$-$C_4$alkoxy, $C_1$-$C_4$alkylamino, phenylamino which can be substituted by sulfo, carboxyl, halogen, $C_1$-$C_4$alkyl and $C_1$-$C_4$alkoxy, cyclohexylamino, morpholino, piperidino or piperazino, A is $C_2$-$C_6$alkylene or phenylene which can be substituted by sulfo, carboxyl, chlorine, methyl, methoxy and ethoxy, and a, b and c are whole or fractional numbers, with the proviso that each of a and c is at least 1, b is a value between 0 and 2 and the sum of a+b+c must be 4, a halogeno-s-triazine of the formula (3), wherein Y' and Y are identical halogen atoms, in which, if desired, in any stage of the process one Y is replaced by an amino, alkoxy, aryloxy, alkylthio or arylthio group by condensation with an amine, alcohol, arylhydroxide, alkylthiol or arylthiol, a phenylenediamine of the formula (4), wherein W is sulfo or carboxyl, and an acylating agent of the formula (5), wherein Z' is halogen and Z is a dihalogeno-s-triazinyl-(6) radical, in which, if desired, in any stage of the process a halogen atom is replaced by an amino, alkoxy, aryloxy, alkylthio or arylthio group by condensation with an amine, alcohol, arylhdroxide, alkylthiol or arylthiol.

Most particularly, the starting materials are a phthalocyanine of the formula (3), wherein Pc is the radical of a copper-(3)- or -(4)-phthalocyanine or nickel-(3)- or -(4)-phthalocyanine, X is $-NH_2$, β-hydroxyethylamino or β-(β-hydroxyethylamino)-ethylamino, A is ethylene, phenylene, or sulfophenylene, and a, b and c are whole or fractional numbers, with the proviso that each of a and c is at least 1, b is a value between 0 and 2 and the sum of a+b+c must be 4, a halogeno-s-triazine of the formula (3), wherein each of Y' and Y is chlorine, a phenylenediamine of the formula (4), wherein W is sulfo, and an acylating agent of the formula (5), wherein Z' is chlorine and Z is a 2-isopropoxy-4-chloro-s-triazinyl-(6) radical.

As the above described individual process steps can be carried out in varying sequence and, if desired, in some cases also simultaneously, different variants of the process are possible. The starting materials for each partial reaction follow from formula (1). In general, the reaction is carried out stepwise in succession, whilst the sequence of the simple reactions between the individual reaction components of the formulae (2) to (5) and, if desired, quaternising components and/or amines, alcohols, arylhydroxides, alkylthiols or arylthiols, can be freely chosen.

The most important process variants for the manufacture of a reactive dye of the formula (1), wherein Y is halogen and Z is a 2-halogeno-4-amino(alkoxy, aryloxy, alkylthio or arylthio)-s-triazinyl-6radical and Pc, X, A, W, a, b and c are as defined for formula (1), comprise:

1. Condensing a phthalocyanine of the formula (2) with a cyanuric halide of the formula (3), condensing the monocondensation product with a phenylenediamine of the formula (4), condensing the secondary condensation product with a cyanuric halide, and replacing a halogen atom in the external s-triazine radical by an amino, aryloxy, alkylthio or arylthio group by condensation with an amine, arylthdroxide, alkylthiol or arylthio. Both these last reaction steps can also be carried out in reverse order by condensing the secondary condensation product in the final step with the monocondensation product of a cyanuric halide and an amine, alcohol, arylhydroxide, alkylthiol or arylthiol.

2. Condensing a phthalocyanine of the formula (2) with a cyanuric halide, also condensing a phenylenediamine of the formula (4), a cyanuric halide and an amine, alcohol, arylhydroxide, alkylthiol or arylthiol, and condensing both intermediates with each other.

3. Condensing the secondary condensation product of a cyanuric halide, a phenylenediamine of the formula (4) and an amine, alcohol, arylhydroxide, alkylthiol or arylthiol with a cyanuric halide, and condensing the resulting intermediate with a phthalocyanine of the formula (2).

4. Condensing a phenylenediamine of the formula (4) with 2 moles of a cyanuric halide and replacing a halogen atom in the condensation product by an amino, aryloxy, alkylthio or arylthio group by condensation with an amine, arylhydroxide, alkylthiol or arylthiol, and condensing the resulting intermediate with a phthalocyanine of the formula (2).

The phthalocyanines of the formula (2) can be prepared by conventional methods which are known per se by condensation of the corresponding phthalocyaninesulfochlorides with alkylene- or arylenediamines of the formula $H_2N-A-NH_2$ in the presence of ammonia or amines.

Instead of using an alkylene- or arylenediamine of the formula $H_2N-A-NH_2$, it is advantageous to use also a monoacyl derivative, in particular a monoacetyl derivative, thereof, from which the acetyl group is removed by saponification after the condensation with the phthalocyaninesulfochloride.

The phthalocyaninesulfohalides can be obtained, for example, by reaction of copper- and nickel-containing phthalocyanines with chlorosulfonic acid or from the phthalocyanines by reaction with acid halogenating agents, such as phosphorus halides, thionyl chloride or chlorosulfonic acid.

Depending on the chosen method of manufacture, the sulfonic acid groups in the phthalocyanine molecule are in the 4-and/or 3-position, depending in turn on whether they have been obtained by starting from 4-sulfophthalic acid or a mixture of 4- and 3-sulfophthalic acid, or whether they are obtained by sulfonation or direct sulfochlorination of the phthalocyanine, in which latter case all four sulfo or sulfochloride groups are bonded in the 3-position.

The resulting phthalocyaninesulfochlorides are condensed with alkylene- or arylenediamines, and the sulfohalide groups which do not participate in this reaction are simultaneously or subsequently partially hydrolysed and reacted with organic amines or, in particular, with ammonia, the amounts and reaction conditions being so chosen that a, b and c have the indicated values.

Suitable organic amines for the above reaction are for example aniline, toluidine, metanilic, orthanilic or sulfanilic acid, araliphatic amines, for example benzylamine, heterocyclic amines, for example piperidine or morpholine, or, in particular, aliphatic amines containing not more than 4 carbon atoms, for example methylamine, ethylamine, β-hydroxyethylamine, β-sulfatoethylamine, taurine, methylaminoethane-2-sulfonic acid. Further amines which can be mentioned in this connection are contained in the subsequent list of amines, alcohols, arylhydroxides, alkylthiols and arylthiols. Alkylene- or arylenediamines which can be used for the manufacture of the phthalocyanines of the formula (2) as described above are:

ethylenediamine, n-propylenediamine, n-butylenediamine,
1-methyl-n-propylenediamine,
n-hexylenediamine,
1,3-diaminobenzene,
1,4-diaminobenzene,
1,3-diamino-4-chlorobenzene,
1,3-diamino-4-methylbenzene,
1,3-diamino-4-ethylbenzene,
1,3-diamino-4-methoxybenzene,
1,3-diamino-4-ethoxybenzene,
1,4-diamino-2methylbenzene,
1,4-diamino-2-methoxybenzene,
1,4-diamino-2-ethoxybenzene,
1,4-diamino-2-chlorobenzene,
1,4-diamino-2,5-dimethylbenzene,
1,4-diamino-2,5-diethylbenzene,
1,4-diamino-2-methyl-5-methoxybenzene,
1,4-diamino-2,5-dimethoxybenzene,
1,4-diamino-2,5-diethoxybenzene,
2,6-diamino-naphthalene,
1,3-diamino-2,4,6-trimethylbenzene,
1,4-diamino-2,3,5,6-tetramethylbenzene,
1,3-diamino-4-nitrobenzene,
4,4'-diaminostilbene,
4,4'-diaminodiphenylmethane,
4,4'-diaminodiphenyl (benzidine),
3,3'-dimethylbenzidine,
3,3'-dimethoxybenzidine,
3,3'-dichlorobenzidine,
3,3'-dicarboxybenzidine,
3,3'-dicarboxymethoxybenzidine,
2,2'-dimethylbenzidine,
4,2'-diaminodiphenyl (diphenyline)
2,6-diaminonaphthalene-4,8-disulfonic acid,
1,4-diaminobenzene-2-sulfonic acid,
1,4-diaminobenzene-2,5-sulfonic acid,
1,4-diaminobenzene-2,6-disulfonic acid,
1,3-diaminobenzene-4-sulfonic acid,
1,3-diaminobenzene-4,6-disulfonic acid,
1-amino-3-acetylaminobenzene (subsequently saponified),
1-amino-3-acetylamino-6-methylbenzene (subsequently saponified),
1-amino-3-acetylamino-6-methoxybenzene (subsequently saponified)
1,4-diamino-2-chlorobenzene-5-sulfonic acid,
1,4-diamino-2-methylbenzene-5-sulfonic acid,
3-(3'- or 4'-aminobenzoylamino)-1-aminobenzene-6-sulfonic acid, 1-(4'-aminobenzoylamino)-4-aminobenzene-2,5-disulfonic acid,
1,4-diaminobenzene-2-carboxylic acid,
1,3-diaminobenzene-4-carboxylic acid,
1,4-diamino-2-methylbenzene,
4,4'-diaminodiphenyl oxide,
4,4'-diaminodiphenylurea-2,2'-disulfonic acid,
4,4'-diaminodiphenyloxyethane-2,2'-disulfonic acid,
4,4'-diaminostilbene-2,2'-disulfonic acid,
4,4'-diaminodiphenylethane-2,2'-disulfonic acid, piperazine.

Examples of phthalocyanines of the formula (2) are:
3-(3'-amino-4'-sulfophenyl)-sulfamoyl-copper phthalocyanine-trisulfonic acid,
di-4-(3'-amino-4'-sulfophenyl)-sulfamoyl-copper phthalocyanine-disulfonic acid,
3-(3'- or 4'-aminophenyl)-sulfamoyl-copper phthalocyaninesulfonamide-disulfonic acid,
3-(3'-amino-4'-sulfophenyl)-sulfamoyl-copper phthalocyaninesulfonamide-disulfonic acid,
3-(3'-amino-4'-sulfophenyl)-sulfamoyl-nickel phthalocyanine-sulfonamide-disulfonic acid,
3-(3'-amino-4'-sulfophenyl)-sulfamoyl-copper phthalocyanine-di-($\beta$-hydroxyethylaminosulfonyl)-sulfonic acid,
3-(4'-aminophenyl)-sulfamoyl-copper phthalocyanine-methylaminosulfonyl-disulfonic acid,
3-(3'-aminophenyl)-sulfamoyl-copper phthalocyanine-$\beta$-sulfatoethylaminosulfonyl-disulfonic acid,
3-(3'-aminophenyl)-sulfamoyl-nickel phthalocyanine-morpholylsulfonyl-disulfonic acid,
3-(3'-amino-4'-sulfophenyl)-sulfamoyl-copper phthalocyanine-phenylaminosulfonyl-disulfonic acid,
3-(4'-amino-3'-sulfophenyl)-sulfamoyl-copper phthalocyanine-sulfonamide-disulfonic acid,
di-3-(4'-amino-3'-sulfophenyl)-sulfamoyl-copper phthalocyanine-sulfonamide-sulfonic acid,
3,4',4'',4'''-(3'-amino-4'-sulfophenyl)-sulfamoyl-copper phthalocyanine-sulfonamide-disulfonic acid,
3,4',4'',4'''-(4'-amino-3'-sulfophenyl)-sulfamoyl-copper phthalocyanine-di-($\beta$-hydroxyethylaminosulfonyl)-sulfonic acid,
3-(3'-aminophenyl)-sulfamoyl-nickel phthalocyanine-sulfonamide-disulfonic acid,
4-(3'-amino-4'-sulfophenyl)-sulfamoyl-copper phthalocyanine-sulfonamide-disulfonic acid,
3-($\beta$-aminoethyl)-sulfamoyl-copper phthalocyanine-trisulfonic acid,
3-[$\beta$($\beta$-hydroxyethylamino)ethyl]-sulfamoyl-copper phthalocyanine-trisulfonic acid,
di-3-[$\beta$($\beta$-hydroxyethylamino)ethyl]-sulfamoyl-copper phthalocyanine-disulfonic acid,
3-(3'-aminophenyl)-sulfamoyl-copper phthalocyanine-trisulfonic acid,
3-(4'-aminophenyl)-sulfamoyl-copper phthalocyanine-$\beta$-hydroxyethylaminosulfonyl-disulfonic acid.

As further starting materials which can be used for the manufacture of the reactive dyes of the formula (1) there may be mentioned:
Halogeno-s-triazines of the formula (3)
2,4,6-trichloro-s-triazine (cyanuric chloride),
2,4,6-trifluoro-s-triazine (cyanuric fluoride),
2,4,6-tribrom-s-triazine (cyanuric bromide),
2,4-dichloro-6-methyl-s-triazine,
2,4-dichloro-6-ethyl-s-triazine,
2,4-dichloro-6-phenyl-s-triazine,
2,4-dibromo-6-phenyl-s-triazine,
2,4-dichloro(bromo or fluoro)-6-amino(alkoxy, aryloxy, alkylthio or arylthio)-s-triazine [see below in the exemplification of the acylating agents of the formula (5)]

Phenylenediamines of the formula (4)
1,4-diaminobenzene-2,5-disulfonic acid,
1,4-diaminobenzene-2,6-disulfonic acid,
1,3-diaminobenzene-4,6-disulfonic acid,
3,6-diaminophthalic acid,
2,5-diaminoterephthalic acid,
4,6-diaminophthalic acid.

The reactive radical Z is in particular a low molecular alkanoyl or alkylsulfonyl radical which is substituted by a removable atom or a removable group, a low molecular alkenoyl or alkenesulfonyl radical which is unsubstituted or substituted by a removable atom or a removable group, a carbocyclic or heterocyclic radical which contains 4-, 5- or 6-membered rings and which is substituted by a removable atom or a removable group, or a triazine or pyrimidine radical which is bonded direct through a carbon atom and substituted by a removable atom or a removable group, or the radical Z contains such a radical. Preferably, the reactive radical is a halotriazine or halopyrimidine radical which is bonded through an amino group.

The reactive radical is introduced into the dye by condensation of an acylating agent of the formula (5), wherein Z' is halogen but can also represent the anhydride group, with an amino group of the phenylenediamine of the formula (4).

Suitable acylating agents which, in addition to the acylating position also contain a reactive radical, are in particular the halides or anhydrides of organic acids which contain atoms or groups of atoms which can be easily replaced.

Examples of such acylating agents are:
chloro- or bromoacetyl chloride,
$\beta$-chloro- or $\beta$-bromopropionyl chloride,
$\alpha,\beta$-dichloro- or $\alpha,\beta$-dibromopropionyl chloride,
chloromaleic anhydride, carbyl sulfate, acryloyl chloride,
$\beta$-chloro- or $\beta$-bromo-acryloyl chloride,
$\alpha$-chloro- or $\alpha$-bromoacryloyl chloride,
$\alpha,\beta$-dichloro- or $\alpha,\beta$-dibromoacryloyl chloride,
trichloroacryloyl chloride, chlorocrotonyl chloride, propiolyl chloride,
3,5-dinitro-4-chlorobenzenesulfochloride or 3,5-dinitro-4-chlorobenzenecarboxylic acid chloride,
3-nitro-4-chlorobenzenesulfochloride or 3-nitro-4-chlorobenzenecarboxylic acid chloride,
2,2,3,3-tetrafluorocyclobutane-1-carboxylic acid chloride,
2,2,3,3-tetrafluorocyclobutyl-acryloyl chloride,
$\beta$-chloroethylsulfonyl-endomethylene-cyclohexanecarboxylic acid chloride,
acrylsulfonyl-endomethylene-cyclohexanecarboxylic acid chloride,
2-chlorobenzoxazolecarboxylic acid chloride,
4,5-dichloro-1-phenylpyridazonecarboxylic acid chloride or 4,5-dichloro-phenylpyridazone-sulfochloride,
4,5-dichloropyridazolpropionyl chloride,
1,4-dichlorophthalazinecarboxylic acid chloride or 1,4-dichlorophthalazine-sulfochloride,
2,3-dichloroquinoxalinecarboxylic acid chloride or 2,3-dichloroquinoxaline-sulfochloride,
2,4-dichloroquinazolinecarboxylic acid chloride or 2,4-dichloroquinoxaline-sulfochloride,
2-methanesulfonyl-4-chloro-6-methylpyrimidine, 2,4-bis-methanesulfonyl-6-methylpyrimidine,
2,4,6-tri- or 2,4,5,6-tetrachloropyrimidine,
2,4,6-tri- or 2,4,5,6-tetrabromopyrimidine,
2-methanesulfonyl-4,5-dichloro-6-methylpyrimidine,
2,4-dichloropyrimidine-5-sulfonic acid,
5-nitro- or 5-cyano-2,4,6-trichloropyrimidine,
2,6-bis-methanesulfonylpyridine-4-carboxylic acid chloride,
2,4-dichloro-5-chloromethyl-6-methylpyrimidine,
2,4-dibromo-5-bromomethyl-6-methylpyrimidine,
2,4-dichloro-5-chloromethylpyridimidine,
2,4-dibromo-5-bromomethylpyrimidine,
2,5,6-trichloro-4-methylpyrimidine,
2,6-dichloro-4-trichloromethylpyrimidine,
2,4-bismethylsulfonyl-5-chloro-6-methylpyrimidine,
2,4,6-trimethylsulfonyl-1,3,5-triazine,
2,4-dichloropyrimidine, 3,6-dichloropyridazine,
3,6-dichloropyridazine-5-carboxylic acid chloride,
2,6-dichloro- or 2,6-dibromo-4-carboethoxypyrimidine,
2,4,5-trichloropyrimidine,
2,4-dichloropyrimidine-6-carboxylic acid chloride,
2,4-dichloropyrimidine-5-carboxylic acid chloride,
2,6-dichloro- or 2,6-dibromopyrimidine-4- or -5-carboxamide or -sulfonamide or -4- or -5-sulfochloride,
2,4,5,6-tetrachloropyridazine,
5-bromo-2,4,6-trichloropyrimidine,
5-acetyl-2,4,6-trichloropyrimidine,
5-nitro-6-methyl-2,4-dichloropyrimidine,
2-chlorobenzthiazole-6-carboxylic acid chloride,
2-chlorobenzthiazole-6-sulfochloride,
5-nitro-6-methyl-2,4-dichloropyrimidine,
2,4,6-trichloro-5-bromopyrimidine,
2,4,5,6-tetrafluoropyrimidine,
4,6-difluoro-5-chloropyrimidine,
2,4,6-trifluoro-5-chloropyrimidine,
2,4,5-trifluoropyrimidine,
2,4,6-trichloro- (-tribromo- or -trifluoro)-s-triazine,
and also 4,6-dichloro(-dibromo- or -difluoro)-s-triazine which are substituted in the 2-position by an aryl or alkyl radical, for example a phenyl, methyl or ethyl radical, or by the radical of an aliphatic or aromatic hydroxyl compound which is bonded through the sulfur atom or through the oxygen atom, or in particular by a —NH$_2$ group or by the radical of an aliphatic, heterocyclic or aromatic amino compound which is bonded through the nitrogen atom.

The 4,6-dihalo-s-triazines which are substituted in the 2-position are obtained, for example, by reaction of trihalo-s-triazines with the above amino, hydroxyl or mercapto compounds. The substituent in the 2-position of a 4,6-dihalo-s-traiazine can be for example the radical of one of the following compounds:

Amines, alcohols, arylhydroxides, alkylthiols and arylthiols ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitro-aniline, 2-methyl-5-nitroaniline, 2,5-dimethoxyaniline, 3-methyl-4-nitroaniline, 2-nitro-4-methyl-aniline, 3-nitro-4-methylaniline, o-, m- and p-phenylenediamine, 3-amino-4-methylaniline, 4-amino-3-methyl-aniline, 2-amino-4-methylaniline, o-, m- and p-anisidine, o-, m- and p-phenetidine, naphthylamine-(1), naphthylamine-(2), 1,4-diaminonaphthalene, 1,5-diamino-naphthalene, 2-amino-1-hydroxynaphthalene, 1-amino-4-hydroxy-naphthalene, 1-amino-8-hydroxy-naphthalene, 1-amino-2-hydroxy-naphthalene, 1-amino-7-hydroxy-naphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-aminosalicyclic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8 and -4,6,8-trisulfonic acid, 2-naphthylamino-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholino, piperidine, piperazine, water, methanol, ethanol, propanol, isopropanol, n-butanol, isobutanol, sec-butanol, tert-butanol, hexanol, cyclohexanol, β-methoxyethanol, β-ethoxyethanol, γ-methoxypropanol, γ-ethoxypropanol, β-ethoxy-β-ethoxyethanol, glycolic acid, phenol, o-, m- and p-chlorophenol, o-, m- and p-nitrophenol, o-, m- and p-hydroxybenzoic acid, o-, m- and p-phenolsulfonic acid, phenol-2,4-disulfonic acid, α-naphthol, β-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1-hydroxynaphthalene-6- or -7-sulfonic acid, 2-hydroxynaphthalene-6-, -7-or -8-sulfonic acid, 2-hydroxynaphthalene-4-sulfonic acid, 2-hydroxynaphthalene-4,8- or -6,8-disulfonic acid, 1-hydroxynaphthalene-4,8-disulfonic acid, 2-hydroxynaphthalene-3,6-disulfonic acid, methanethiol, ethanethiol, propanethiol, isopropanethiol, n-butanethiol, thioglycollic acid, thiourea, thiophenol, α-thionaphthol, β-thionaphthol.

Further eligible compounds are those of dyestuff character, for example 4-nitro-4'-aminostilbenedisulfonic acid, 2-nitro- 4'-aminodiphenylamino-4,3'-stilbenedisulfonic acid, 2-nitro-4'-aminodiphenylamino-4,3'-disulfonic acid and, in particular, aminoazo dyes or aminoanthraquinones or phthalocyanines which additionally contain at least one reactive amino group.

The introduction of the substituent in the 2-position of the triazine radical can also be performed subsequently. Accordingly, one of the above amino, hydroxy or mercapto compounds can be condensed subsequently with a dihalo-s-triazine radical which is already bonded to the reactive dye of the formula (1). This possibility is also to be taken into consideration in the process for the manufacture of the reactive dyes of the formula (1) described hereinbefore.

The acylation reactions with the fibre-reactive acylating agents are advantageously carried out using acid acceptors, such as sodium carbonate or sodium hydroxide, and under such conditions that replaceable halogen atoms, unsaturated bonds or the like still remain in the reactive radical, that is to say, for example, in organic solvents or at relatively low temperatures.

What has been stated above regarding the possibility of replacing a halogen atom at the s-triazine radical by an amino, alkoxy, aryloxy, alkylthio or arylthio group by reaction with an amino, hydroxy or mercapto compound, also applies, where appropriate, to other reactive radicals.

If a reactive radical still contains several easily removable substituents, for example halogen atoms, this radical can be condensed with compounds which contain a reactive hydrogen atom which is bonded through a heteroatom and which is able to react with a removable substituent of the reactive radical to form a group which is bonded through the heteroatom. Accordingly, a chlorine atom in the trichloropyrimidine radical can be replaced by one of the corresponding radicals by reaction with ammonia, an amine, alcohol, phenol or mercaptan.

Instead of subsequently replacing a halogen atom in a dihalotriazine radical by an amino, alkoxy, aryloxy, alkylthio or arylthio group, it is also possible to use, as fibre-reactive acylating agent, a dihalotriazine which already contains an amino, alkoxy, aryloxy, alkylthio or arylthio group bonded to the triazine ring.

The condensation reactions of the halogeno s-triazines of the formula (3) and the acylating agents of the formula (5) with the phthalocyanines of the formula (2) and the phenylenediamines of the formula (4) and, optionally, the amines, alcohols, arylhydroxides, alkylthiols and arylthiols, are carried out preferably at low temperature and at a weakly acid or neutral to weakly alkaline pH value. Hydrogen halide liberated during the condensation is advantageously neutralised continuously by the addition of aqueous hydroxides, carbonates or bicarbonates of alkali metals.

In the reactive dyes of the formula (1), a halogen atom Y and also a halogen atom in a halogeno-s-triazine radical Z in the terminal position can be replaced by reaction with ternary amines (such as triethylamine) or with hydrazines (such as N,N-dimethylhydrazine) to produce reactive dyes, the removable substituent of which is a quaternary ammonium or hydrazinium group which is bonded to a carbon atom and which carries the positive charge at a nitrogen atom which is attached direct to the s-triazine ring, that is to say that, for example, an external s-triazine radical is a group of the formula

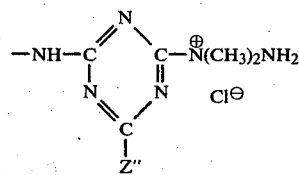

wherein Z" is halogen, an amino, alkoxy, aryloxy, alkylthio or arylthio group.

The reactive dyes of the formula (1) can be isolated and processed to useful dry dyeing preparations. Isolation is effected preferably at low temperatures as possible by salting out and filtration. The filtered dyes can be dried, if desired after addition of extenders and/or buffers, for example after addition of a mixture of equal parts of monosodium and disodium phosphate. Preferably, drying is carried out at not too elevated temperatures and under reduced pressure. By spray drying the entire reaction mixture, it is possible in certain cases to obtain the dry preparations of the invention direct, i.e. without first isolating the dyes.

The reactive dyes of the formula (1) are distinguished by high reactivity, a high degree of fixation, good build-up and the ease with which non-fixed dye can be washed off. The dyeings and prints obtained with the reactive dyes of the formula (1) are strong and have good lightfastness as well as good wetfastness properties, for example good fastness to washing. They are suitable for dyeing and printing a very wide variety of materials, such as silk, leather, wool, polyamide and polyurethane fibres, and especially cellulosic materials of fibrous structure, such as linen, cellulose, regenerated cellulose, and in particular cotton.

They are suitable both for the exhaustion process and for dyeing by the pad-dyeing process, in which the goods are impregnated with aqueous and, if appropriate, also with salt-containing dye solutions, and the dyes are fixed after treatment with alkali or in the presence of alkali, with or without the application of heat.

They are also suitable for printing, in particular on cotton, and also for printing nitrogen-containing fibres, for example wool, silk or blends containing wool.

To improve the wetfastness properties it is advisable to rinse the dyeings and prints thoroughly with cold and hot water, if appropriate with the addition of an agent which acts as a dispersant and promotes the diffusion of non-fixed dye.

In the following Examples, the parts and percentages are by weight.

EXAMPLE 1

10 parts of 1,4-phenylenediamine-2,5-disulfonic acid are dissolved neutral in 100 parts of water. Then 7.63 parts of 2-isopropoxy-4,6-dichloro-s-triazine are run in while cooling with ice. The liberated hydrogen chloride is neutralised with sodium hydroxide initially at 0°-5° C., then later at 20° C. After a reaction time of about 4 hours no further change in the pH value is observed and a virtually clear solution is obtained. This solution is run into a fine suspension of 7 parts of cyanuric chloride in 55 parts of ice-water. The liberated hydrogen chloride is again continuously neutralised with sodium hydroxide solution and the temperature is gradually raised to about 20° C. After about 3 hours there is again virtually no further uptake of sodium hydroxide are the resulting suspension goes completely into solution on dilution with water. A neutral solution of 34.3 parts of the compound of the formula

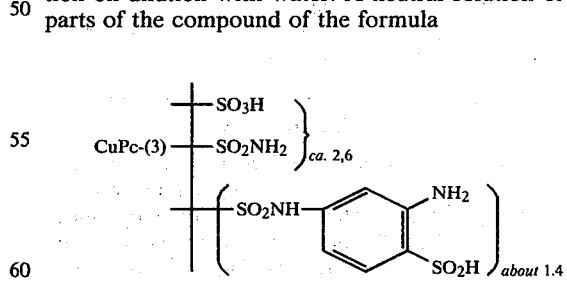

in about 200 parts of water is then run in and the liberated hydrogen chloride is continuously neutralised with sodium hydroxide. The uptake of alkali ceases after about 24 hours. After filtering the solution clear, the reactive dye is salted out with sodium chloride and isolated by filtration.

Yield: 48.7 parts of a product of the formula

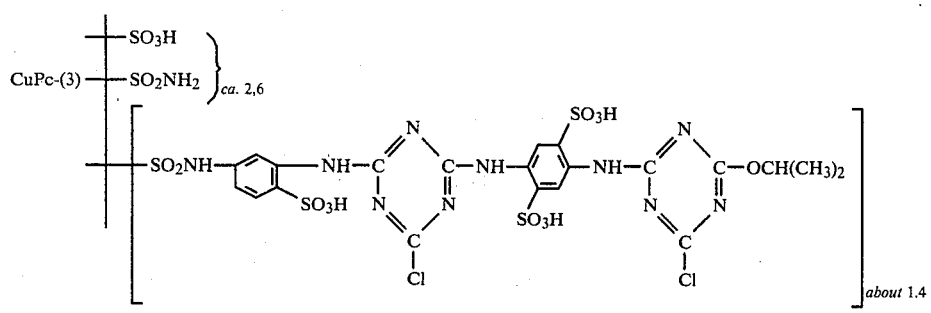

which dyes substrates based on cellulose in the presence of alkalies in fast turquoise blue shades of excellent light-fastness and excellent wet fastness properties. The dyeings have a surprisingly low content of unfixed dye, which can be washed off with surprising ease. The phthalocyanine intermediate is prepared in conventional manner by condensation of copper phthalocyanine-3,3',3'',3'''-tetrasulfochloride with 1,3-phenylenediamine-4-sulfonic acid in the presence of ammonia.

EXAMPLE 2

0.1 mole of the compound of the formula

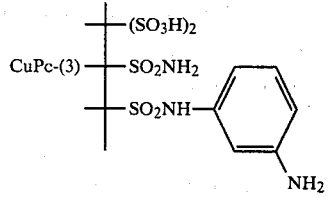

(containing 0.1 mole of acylatable amino groups) is dissolved neutral in 1000 ml of water and this solution is combined with 0.11 mole of an aqueous solution of the reactive intermediate described in Example 1. With good stirring, the temperature is raised in the course of 1 hour to 45° C. and then kept for about 12 hours. The reaction mixture is kept continually at pH 6.5 to 7.5 by the dropwise addition of dilute sodium hydroxide. The dye of the formula

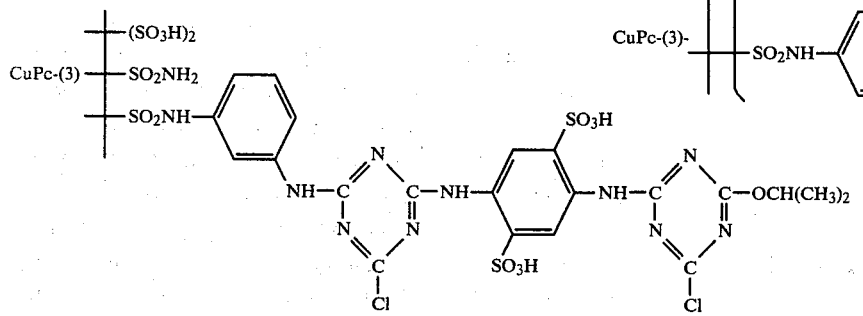

is precipitated with sodium chloride, collected by filtration and dried. The dye has the same good tinctorial properties as the dye of Example 1 and is particularly suitable for the exhaust method. Dyes having similarly good properties are obtained by repeating the above procedure, but using in each case one of the following phthalocyanine intermediates instead of that of Example 2:

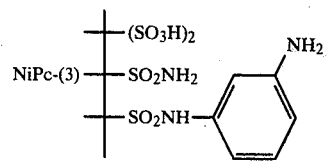

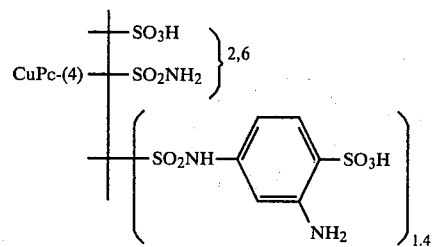

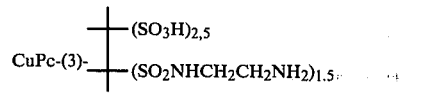

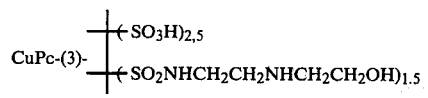

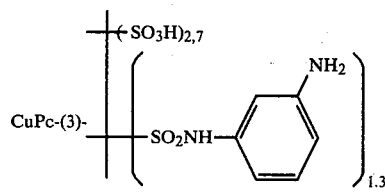

-continued

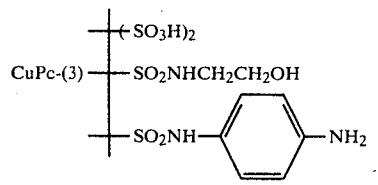

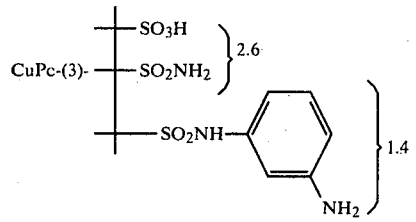

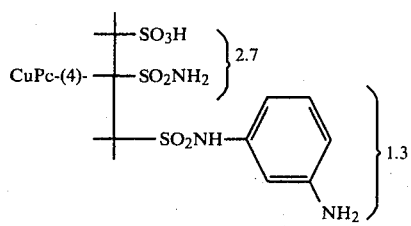

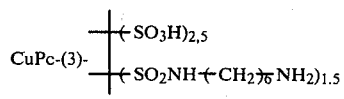

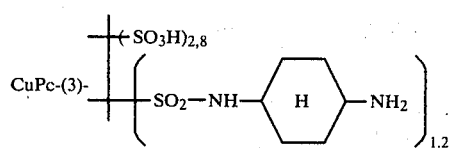

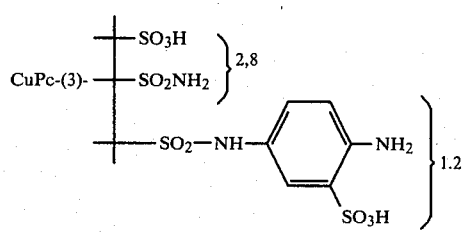

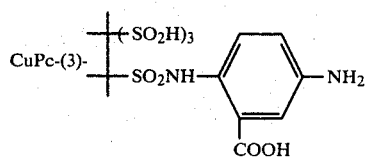

-continued

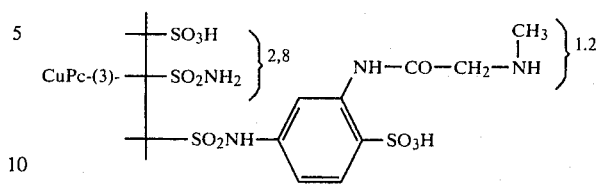

Dyes having similarly good properties are also obtained by repeating the procedure of this Example, but using the following reactive acylating agents instead of 2-isopropoxy-4,6-dichloro-s-triazine for the manufacture of the reactive intermediate described in Example 1:

2-methoxy-4,6-dichloro-s-triazine
2-propoxy-4,6-dichloro-s-triazine
2-β-ethoxyethoxy-4,6-dichloro-s-triazine
2-amino-4,6-dichloro-s-triazine
2-aminophenyl-(-6'-sulfonic acid)-4,6-dichloro-s-triazine
2-amino-4,6-difluoro-s-triazine
2-aminophenyl-(6'-sulfonic acid)-4,6-difluoro-s-triazine
2,4-dichloro-6-methyl-s-triazine
2,4-dichloro-6-phenyl-s-triazine
β-bromopropionyl chloride
α,β-dibromopropionyl chloride
2,2,3,3-tetrafluorocyclobutane-1-carboxylic acid chloride
2,3-dichloroquinoxalinecarboxylic acid chloride
2,4-difluoro-6-(4'-β-sulfatoethylsulfonylphenylamino)-s-triazine.

EXAMPLE 3

0.1 mole of 1,4-phenylenediamine-2,5-disulfonic acid are dissolved neutral in 2000 ml of water. Then 0.1 mole of 2-isopropyl-4,6-dichloro-s-triazine is run in while cooling with ice. The liberated hydrogen chloride is neutralised with sodium hydroxide initially at 0°–5° C. and later at 20° C. After a reaction time of about 4 hours no further change in the pH value is observed.

The resulting solution is cooled again to 0° C. With intensive stirring, 0.1 mole of cyanuric fluoride is added dropwise while simultaneously keeping the pH at 5 to 6 by the dropwise addition of dilute sodium hydroxide. After 1 hour, a neutral solution of 0.09 mole of the copper phthalocyanine compound of Example 2 in 900 ml of water is added. The reaction mixture is kept at pH 6 to 7 by the dropwise addition of dilute sodium hydroxide. The initial temperature of 0° C. is raised in the course of 2 hours to 20°–25° C. When the pH value no longer changes, the dye of the formula

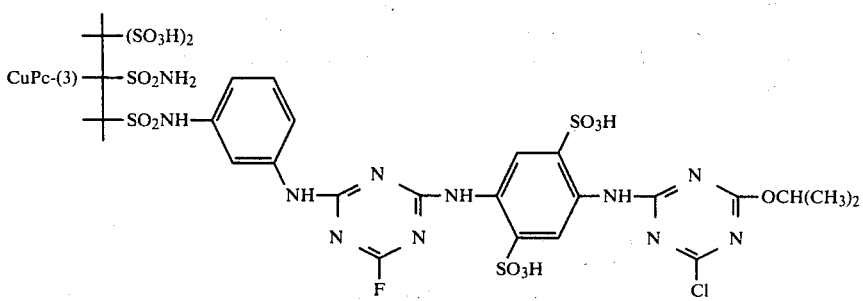

is precipitated with sodium chloride, collected by filtration and dried. The dye has the same good properties as the dye of Example 1 and is particularly suitable for dyeing by the exhaust method.

DYEING PROCEDURE 1

2 parts of the dye obtained in Example 1 are dissolved at 20° to 50° C. in 100 parts of water with the addition of 5 to 20 parts of urea and 2 parts of calcined sodium carbonate. A cotton fabric is impregnated with this solution to a pick-up of 60 to 80% and then dried. The fabric is then thermofixed for 30 seconds to 5 minutes at 140° to 210° C., subsequently soaped for a quater of an hour in a 0.1% boiling solution of a non-ionic detergent, rinsed and dried.

DYEING PROCEDURE 2

2 parts of the dye obtained in Example 1 are dissolved at 75° C. in 2000 parts of water with the addition of 2 to 10 parts of sodium chloride or calcined Glauber's salt. Then 2 to 3 parts of a cotton fabric are put into this dyebath and the temperature is kept constant for 30 to 60 minutes. Two parts of calcined sodium carbonate and 0.3 ml of sodium hydroxide solution (36° Bé) are then added. The temperature is kept for a further 45 to 60 minutes at 75° to 80° C. and the fabric is then soaped for 15 minutes in a 0.1% boiling solution of a non-ionic detergent, rinsed and dried.

DYEING PROCEDURE 3

2 parts of the dye obtained in Example 1 are dissolved in 100 parts of water while adding 0.5 part of sodium m-nitrobenzenesulfonate. A cotton fabric is impregnated with the resulting solution to a liquor pick-up of 75% and then dried.

The fabric is then impregnated with a warm solution of 20° C. which contains, per liter, 5 g of sodium hydroxide and 300 g of sodium chloride, and squeezed out to a pick-up of 75%. The dyeing is steamed for 30 seconds at 100° to 101° C., rinsed, soaped for a quater of an hour in a 0.3% boiling solution of a non-ionic detergent, rinsed and dried.

DYEING PROCEDURE 4

2 parts of the dye obtained in Example 1 are dissolved in 100 parts of water. The solution is added to 1900 parts of cold water, 60 parts of sodium chloride are added and 100 parts of a cotton fabric are put into this dyebath. The temperature is raised for 40° C. and 40 parts of calcined sodium carbonate and another 60 parts of sodium chloride are added after 30 minutes. The temperature is kept for 30 minutes at 40° C. The dyeing is rinsed and then soaped for 15 minutes in a 0.3% boiling solution of a non-ionic detergent, rinsed and dried.

PRINTING PROCEDURE 2 parts of the dye obtained according to Example 1 are sprinkled, with rapid stirring, into 100 parts of a stock thickening which contained 45 parts of 5% sodium alginate thickening, 32 parts of water, 20 parts of urea, 1 part of sodium m-nitrobenzenesulphonate and 2 parts of sodium carbonate.

A cotton fabric is printed with this printing paste on a roller printing machine. The printed fabric is steamed for 4 to 8 minutes at 100° C. in saturated steam, then thoroughly rinsed in cold and hot water, in the process of which non-fixed dye can be very easily removed from the fabric, and then dried.

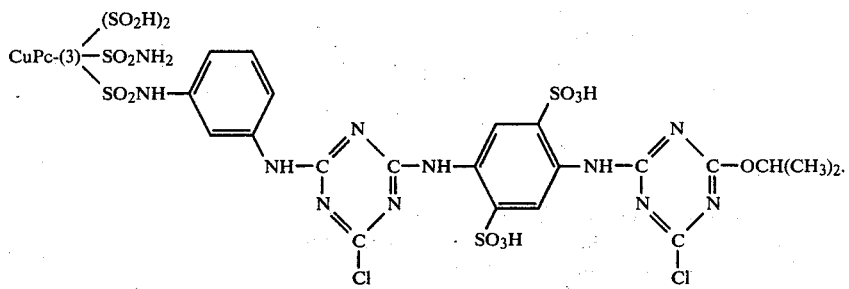

What is claimed is:

1. Reactive dyes of the formula

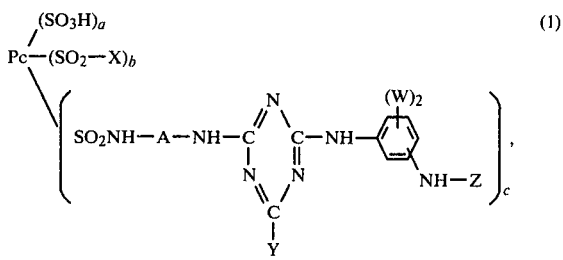

wherein Pc is the radical of a copper or nickel phthalocyanine, X is —NH$_2$ or the radical of an aliphatic, cycloaliphatic, aromatic or heterocyclic amine, A is a phenylene radical that does not contain sulfo as substituent, Y is fluorine or chlorine, W is sulfo or carboxyl, and Z is a alkoxy- or alkoxyalkoxy-chloro-triazino, and a, b and c are whole or fractional number with the proviso that each of a and c is at least 1, b is a value between 0 and 2 and the sum of a+b+c must be 4.

2. Reactive dyes according to claim 1, wherein Pc is the radical of a copper-(3)- or -(4)-phthalocyanine or nickel -(3)- or -(4)-phthalocyanine, X is —NH$_2$, C$_1$-C$_4$alkylamino or N,N-di-C$_1$-C$_4$alkylamino which can be substituted by sulfo, carboxyl, sulfato, halogen, hydroxyl, cyano, phenyl, C$_1$-C$_4$-alkoxy, C$_1$-C$_4$-alkylamino or hydroxy-C$_1$-C$_4$-alkylamino, phenylamino which can be substituted by sulfo, carboxyl, halogen, C$_1$-C$_4$-alkyl or C$_1$-C$_4$-alkoxy, or is cyclohexylamino, morpholino, piperidino or piperazino, A is phenylene which can be substituted by carboxyl, chlorine, methyl, methoxy or ethoxy, Y is fluorine or chlorine, W is sulfo or carboxyl and Z is a 2-chloro-4-alkoxy-s-triazinyl-(6) radical, and a, b and c are whole or fractional numbers, with the proviso that each of a and c is at least 1 and b is a value between 0 and 2 and the sum of a+b+c must be 4.

3. Reactive dyes according to claim 2, wherein Pc is the radical of a copper-(3)- or -(4)-phthalocyanine or nickel-(3)- or -(4)-phthalocyanine, X is —NH$_2$-, β-hydroxyethylamino or β-(β-hydroxyethylamino)-ethylamino, A is phenylene, Y is chlorine, W is sulfo and Z is a 2-isopropoxy-4-chloro-s-triazinyl-(6) radical, and a, b and c are whole or fractional numbers, with the proviso that each of a and c is at least 1, b is a value between 0 and 2 and the sum of a+b+c must be 4.

4. The reactive dye according to claim 3 of the formula